J. L. Lord,
Grindstone Frame.
N° 11,526. Patented Aug. 15, 1854.
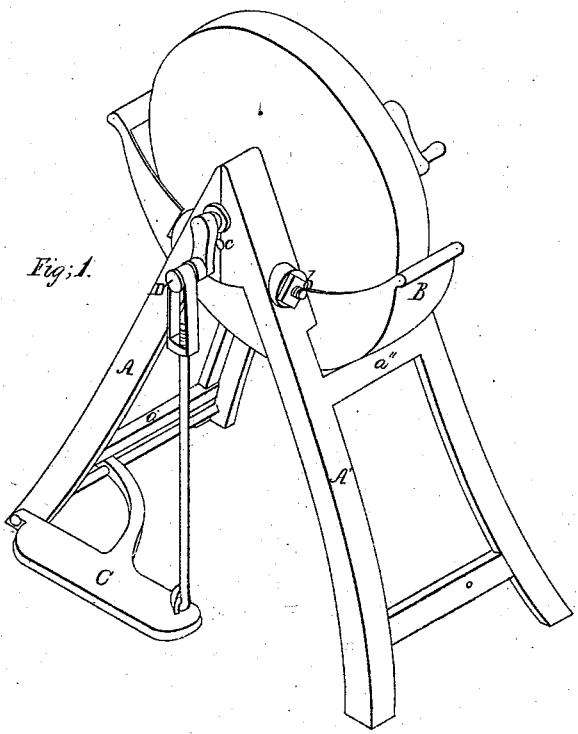
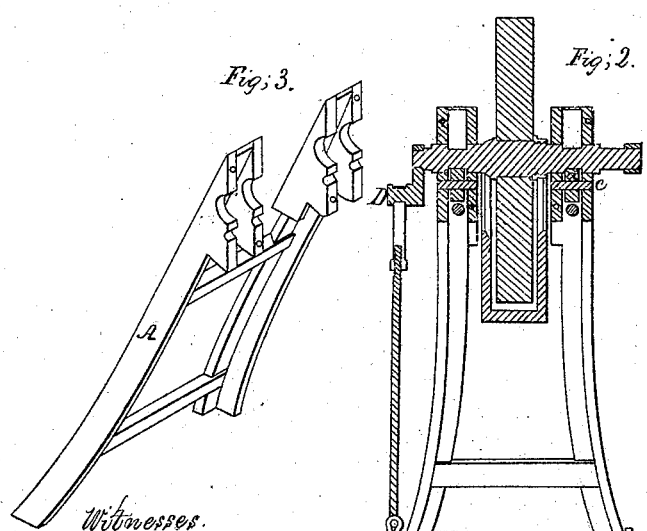
Witnesses.
John S. Blow
Sam. Cowper
Inventor.
J. L. Lord

UNITED STATES PATENT OFFICE.

J. L. LORD, OF CHESTER, CONNECTICUT.

GRINDSTONE-FRAME.

Specification of Letters Patent No. 11,526, dated August 15, 1854.

*To all whom it may concern:*

Be it known that I, J. L. LORD, of Chester, in the county of Middlesex and State of Connecticut, have invented certain new and useful Improvements in Grindstone - Frames; and I hereby declare the following to be a full, clear, and exact description of the same, reference being had to the annexed drawings, making part of this specification, in which—

Figure 1 is an isometrical view of the frame set up. Fig. 2 a transverse section through the center of the same. Fig. 3 a view of one of the halves of the frame.

The friction rollers for hanging grindstones have heretofore been set in open boxes upon the upper bars of the frame. In this position they are constantly exposed to dust and water, by which their action is clogged and the rollers themselves are rusted and worn. In addition to this inconvenience, the shaft of the grindstone rests upon the surface of the rollers, and not being confined in any way to the frame, it is easily thrown off of its bearings by sudden pressure upon the treadle or by power irregularly applied to the crank.

To remedy these defects and at the same time to obtain a cheap and compact frame in which the friction rollers and bearings of the stone shall be entirely protected from the weather while the shaft of the stone is secured firmly to the frame and cannot be thrown therefrom intentionally or by accident, are the objects of my improvements.

To enable others skilled in the art to make and use my invention I will proceed to describe its construction and operation.

The frame is of iron and is cast in two parts A and A' each consisting of two legs united by cross bars $a$ $a'$.

$b$ are screw bolts by which the two halves of the frame are united together.

$c$ are the bearings for the friction rollers, $d$ the bearings of the shaft of the stone which are made at the time of casting.

B is the trough also of cast iron which rests upon the upper cross bars $a'$ $a''$; C the treadle, D the crank by which the stone may be turned by hand.

It will be perceived that the whole frame is composed of but two pieces which are so shaped and arranged as entirely to protect the friction roller and the gudgeon of the shaft from dust and water, while the shaft is effectually prevented from jumping from its bearings when the power is applied irregularly, no extra means being adapted to secure either of these ends other than is afforded by the construction of the frame itself.

What I claim as my invention and desire to secure by Letters Patent is—

The above grindstone frame constructed as set forth, that is to say, cast in two pieces of such form that when put together in the manner described it shall furnish the bearings for the shaft and friction roller, both of which shall be protected from injury and from dust or water, and also from being displaced from their position in the frame either by accident or design.

In testimony whereof I have hereunto set my signature.

J. L. LORD.

Signed in presence of—
Jos. E. SILLIMAN,
HIRAM H. CLARK.